(12) United States Patent
Cobianu et al.

(10) Patent No.: US 7,401,525 B2
(45) Date of Patent: Jul. 22, 2008

(54) MICRO-MACHINED PRESSURE SENSOR WITH POLYMER DIAPHRAGM

(75) Inventors: Cornel P. Cobianu, Bucharest (RO); Mihai Gologanu, Bucharest (RO); Ioan Pavelescu, Bucharest (RO); Bogdan Catalin Serban, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 51 days.

(21) Appl. No.: 10/907,176

(22) Filed: Mar. 23, 2005

(65) Prior Publication Data

US 2006/0213275 A1 Sep. 28, 2006

(51) Int. Cl.
*G01L 9/00* (2006.01)
*H01L 51/40* (2006.01)
(52) U.S. Cl. ............... 73/754; 73/753; 438/53
(58) Field of Classification Search ........... 73/700–756; 438/47, 50, 51, 53, 99, 510, 514, 527, 528; 257/40, 414, 417
See application file for complete search history.

(56) References Cited

U.S. PATENT DOCUMENTS

| | | | |
|---|---|---|---|
| 4,808,336 A | 2/1989 | Rubner et al. | |
| 5,262,195 A | 11/1993 | Moss et al. | |
| 5,309,767 A | 5/1994 | Parmar et al. | |
| 5,505,093 A | 4/1996 | Giedd et al. | |
| 6,079,277 A | 6/2000 | Chung | |
| 6,109,113 A | 8/2000 | Chavan et al. | |
| 6,155,120 A * | 12/2000 | Taylor | 73/862.046 |
| 6,262,195 B1 | 7/2001 | Dall'Occo et al. | |
| 6,263,672 B1 | 7/2001 | Roby et al. | |
| 6,263,739 B1 | 7/2001 | Seefried et al. | |

(Continued)

FOREIGN PATENT DOCUMENTS

DE 19832681 2/2000

(Continued)

OTHER PUBLICATIONS

Lennart Lofdahl and Mohammed Gad-el-Hak, MEMS-based pressure and shear stress sensors for turbulent flows, 1999 IOP Publishing Ltd., pp. 667-668 See Figures 2.*

(Continued)

*Primary Examiner*—Edward Lefkowitz
*Assistant Examiner*—Jermaine Jenkins
(74) *Attorney, Agent, or Firm*—Kris T. Fredrick

(57) ABSTRACT

A piezoresistive pressure and/or strain sensor micro-machined primarily from plastic and/or glass. In one illustrative embodiment, the piezoresistive pressure sensor is formed on a polymer substrate. A first selectively implanted region is provided in the polymer substrate to create a piezoresistive region in the polymer substrate. A second selectively implanted region is then provided in at least part of the first selectively implanted region to modulate the electrical conductivity of the first selectively implanted region. The illustrative sensor may be selectively implanted with, for example, nitrogen to create the piezoresistive region, and boron to modulate the electrical conductivity of the piezoresistive region. Phosphorus or any other suitable material may also be used to modulate the electrical conductivity of the piezoresistive region, as desired. The piezoresistive pressure/strain sensor may be formed from a single substrate, or two or more substrates, and the resulting pressure/strain sensor may be mounted in a plastic package, if desired.

40 Claims, 6 Drawing Sheets

U.S. PATENT DOCUMENTS

| | | |
|---|---|---|
| 6,288,181 B1 | 9/2001 | Ford et al. |
| 6,607,632 B1 | 8/2003 | McDonnell et al. |
| 2003/0089182 A1* | 5/2003 | Thaysen et al. ........ 73/862.621 |

FOREIGN PATENT DOCUMENTS

| | | |
|---|---|---|
| GB | 2141548 | 12/1984 |

OTHER PUBLICATIONS

Forlani, "Thick-Film Sensors for Automotive Electronics," 4th European Hybrid Microelectronics Conference, pp. 165-177, 1983.

Frazier et al., "Mechanical and Piezoresistive Properties of Graphite-Filled Polymide Thin Films," Materials Research Society Proceedings, vol. 278, 7 pages, 1992.

Giedd et al., "Temperature Sensitive Ion-Implanted Polymer Films," Nuclear Instruments and Methods in Physics Research B59/60, pp. 1253-1256, 1991.

Harsanyi, "Polymer Thick-Film Technology: a Possibility to Obtain Very Low Cost Pressure Sensors?", Sensors and Actuators, pp. 853-857, 1991.

* cited by examiner

MICRO-MACHINED PRESSURE SENSOR WITH POLYMER DIAPHRAGM

FIELD

The present invention relates generally to micro-machined sensors and more particularly to micro-machined plastic piezoresistive pressure and/or strain sensors.

BACKGROUND

There is a need for new low cost sensors, such as strain and/or pressure sensors. One application for such low cost sensors is in the disposable market, such as in the biomedical domain where single use devices are often used. Many other markets and applications also exist. In the past decade, there has been progress made in the development of polymer thin and thick films for use as flexible electronics and different sensing applications. For example, piezoresistive metal foils have been deposited on flexible polymer substrates to form strain gauges. Some drawbacks of these types of sensors include the de-lamination of the metal film over time, the relatively low resistivity of the piezoresistive metal, thereby requiring relatively large sensors, and rather low gauge factors for the metal foils.

Silicon Micro-Electro-Mechanical Systems (MEMS) technology has also been used in manufacturing strain and pressure sensors, in some cases with the advantage of integrating the sensor and the supporting electronic circuits for signal conditioning and processing on the same chip. In spite of the well-established silicon MEMS technology, the cost of these devices cannot usually be reduced below certain limits, often due in part to the cost of the single crystal silicon substrate. Thus, there remains a need for new low cost sensors based on cheaper substrates.

SUMMARY

The following summary of the invention is provided to facilitate an understanding of some of the innovative features unique to the present invention and is not intended to be a full description. A full appreciation of the invention can be gained by taking the entire specification, claims, drawings, and abstract as a whole.

The present invention relates generally to micro-machined sensors such as pressure and/or strain sensors, and more particularly to micro-machined primarily plastic and/or glass piezoresistive sensors. In one illustrative embodiment, a piezoresistive pressure sensor is formed on a polymer substrate. A first selectively ion implanted region is provided in the polymer substrate to create a piezoresistive region in the polymer substrate. A second selectively implanted region is then provided in at least part of the first selectively ion implanted region to modulate the electrical conductivity of the first selectively implanted region. The illustrative sensor may be selectively implanted with, for example, nitrogen to create the piezoresistive region, and boron to modulate the electrical conductivity of the piezoresistive region. Phosphorus or any other suitable chemical element or material may also be used to modulate the electrical conductivity of the piezoresistive region, as desired.

In some cases, the substrate can be plastic. The plastic may be, for example, Kapton, a Liquid Crystal Polymer (LCP), or any other suitable plastic, as desired. In some cases, the backside of the plastic substrate may be selectively etched to create a diaphragm region for the pressure sensor. Alternatively, and in some cases, a second substrate may be bonded adjacent to the first substrate with a hole micro-machined there through, so that the first substrate forms a diaphragm that extends across the micro-machined hole in the second substrate. One or more metal contact pads may be provided on the sensor to provide an electrical interconnect between the piezoresistive region(s) and one or more bond pads, and the sensor may be packaged in an all plastic packaging material, if desired.

BRIEF DESCRIPTION

DETAILED DESCRIPTION

Figure 1A:
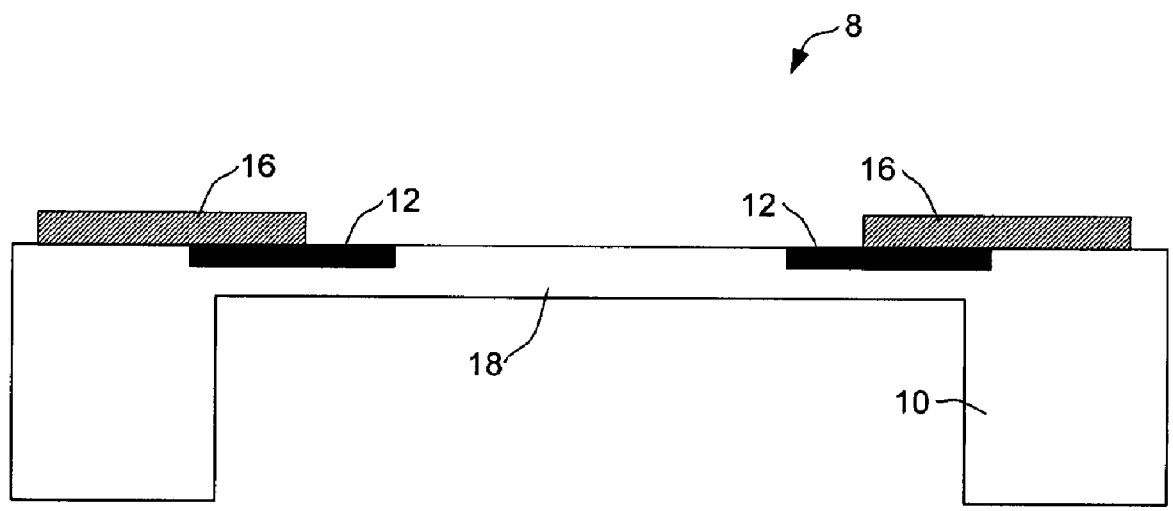
FIG. 1A is a schematic cross-sectional side view of an illustrative piezoresistive pressure sensor in accordance with the present invention.

The following description should be read with reference to the drawings wherein like reference numerals indicate like elements throughout the several views. The detailed description and drawings show several embodiments, which are meant to be illustrative of the claimed invention FIG. 1A is a schematic cross-sectional side view of an illustrative piezoresistive pressure sensor in accordance with the present invention. While a pressure sensor is shown, it is contemplated that the present invention may be applied to other types of sensors, such as strain gauges, etc. The illustrative piezoresistive pressure sensor may be an absolute pressure sensor or a differential pressure sensor, as desired. In some cases, the pressure sensor may be a substantially all-plastic pressure sensor with implanted piezoresistive regions.

In FIG. 1A, the pressure sensor is generally shown at 8 and includes a polymer substrate 10. In some cases, the polymer substrate 10 may be a plastic such as Kapton, a liquid crystal polymer (LCP), or any other suitable plastic, as desired. Kapton is the Trade Name for a polyimide film available from the DuPont Corporation. The substrate 10 may include one or more piezoresistive regions 12. In the illustrative embodiment, the one or more piezoresistive regions 12 may be double implanted. One implant may create the piezoresistive regions 12 in the polymer substrate 10, and the other implant may modulate the electrical conductivity of the piezoresistive regions 12 created by the first implant.

In some cases, the first implant is a nitrogen implant. However, the first implant may be any element or material that may help provide a piezoresistive effect in the polymer substrate 10. The second implant may be, for example, a boron, a phosphorus, or any other implant that helps modulate (increase) the electrical conductivity of the initially higher resistivity piezoresistive regions 12 created by the first implant. In some cases, the second implant may be adapted to increase the electrical conductivity of the piezoresistive regions, thereby allowing a controlled number of squares to be used to produce a desired resistance value.

In the illustrative embodiment, the implanted regions 12 may be ion implanted. During ion implantation, ion atoms may be accelerated through an electric field and directed toward the substrate 10. By measuring the ion beam current, the dose of the implanted ions is controlled, while the electric field accelerating the ions will determine the penetration depth of the ion implant in the plastic substrate. Alternatively, any other process may be used to cause nitrogen or other atoms to become lodged in the piezoresistive regions 12 of the substrate 10, including diffusion, if desired.

The illustrative pressure sensor may include a polymer pressure sensing diaphragm region 18, as shown. The diaphragm 18 may be formed in any number of ways. For example, the diaphragm 18 may be formed by etching the back-side of the polymer substrate 10. In some cases, a wet etch, ion milling, reactive ion etch (RIE), or any other suitable process may be used, as desired, to etch the back side of the polymer substrate 10, leaving the thinned diaphragm region 18. In some cases, the polymer substrate 10 may be etched until the thickness of the diaphragm region 18 has a desired thickness.

The illustrative pressure sensor may also include one or more metal contacts or traces 16. The metal contacts 16 may be aligned so that at least a portion of the one or more metal contacts 16 covers and is in electrical contact with at least a portion of the one or more piezoresistive regions 12. In some cases, the metal contacts 16 may include a composition of chromium and gold, but other materials may be used, as desired. The metal contacts 16 may be deposited by evaporation, chemical vapor deposition (CVD), sputtering, maskless, additive direct printing or any other suitable method, as desired. In some cases, and to help reduce the effects of metal de-lamination, the metal contacts 16 may be deposited in layers. For example, a chromium layer may first be deposited, followed by a gold layer. One possible advantage of using mask-less, additive direct printing of the metal layer(s) is the absence of any lithography steps, which often need precautions in the removal of the photo-resist without affecting the integrity of the polymer plastic substrate.

The plastic substrate 10 may be any suitable plastic, such as Kapton. In some cases, a Kapton sheet may be obtained having a desired thickness, such as in the range of 50-400 microns, more preferably in the range of 100-200 microns thick, and even more preferably about 130 microns thick, as desired. Kapton may be particularly suitable because of its thermal, mechanical and chemical stability, particularly when used in conjunction with conventional integrated circuit (IC) processes. Also, Kapton can produce a piezoresistive effect by ion implantation of nitrogen. In another example, poly styrene-co-acrylonitrile (SAN) 80/20 may be used. Polystyrene-co-acrylonitrile 80/20 may also produce a piezoresistive effect by ion implantation of nitrogen, and may have similar chemical resistance to solvents used in conventional IC photo-resist removal, particularly after nitrogen implantation.

Before and/or after the piezoresistive region is formed in the plastic substrate 10 by nitrogen implantation, the electrical conductivity of the piezoresistive region(s) may be modulated or set by boron implantation. Boron implantation is given here as an example, but other ions such as phosphorus or other suitable element(s) may be used to set or control the electrical conductivity and/or piezoresistive effects of the piezoresistive region(s).

The Kapton substrate 10 may be batch processed in any number of ways. In some cases, a Kapton "wafer" is obtained having a certain thickness, area and shape so as to be compatible with desired batch processing equipment. The Kapton wafers may be, for example, 1 squared feet (33 cm×33 cm) or more, or less. Modern IC processing equipment can often handle wafers with this size.

Figure 1B:
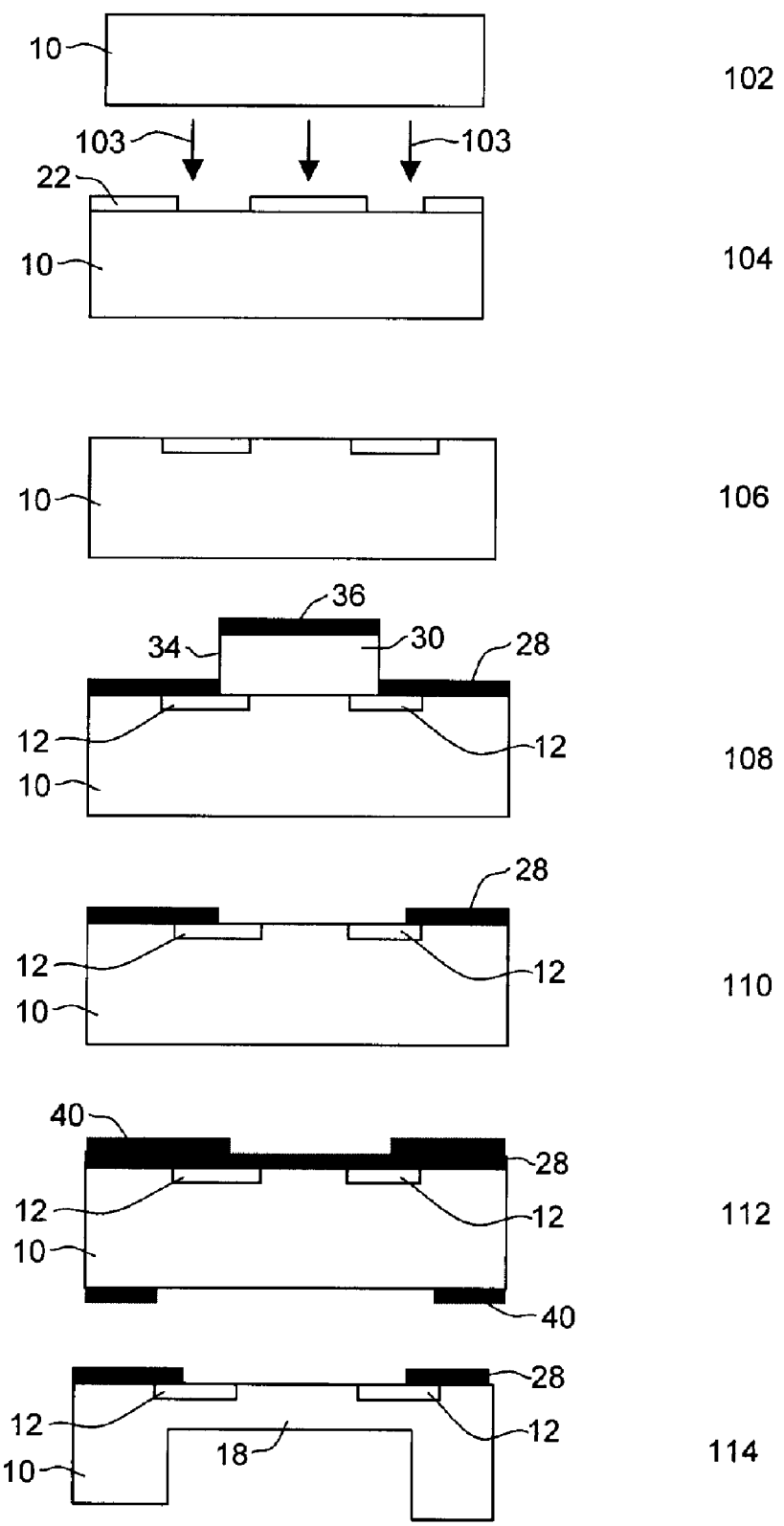
FIG. 1B is a schematic cross-sectional side view of an illustrative fabrication process of the illustrative piezoresistive pressure sensor of FIG. 1A.

FIG. 1B is a schematic cross-sectional side view of an illustrative fabrication process of the piezoresistive pressure sensor of FIG. 1A. In the illustration fabrication process, the piezoresistive pressure sensor may be fabricated using MEMS technology. The MEMS technology may include mostly bulk micro-machining processes, however, surface micro-machining may be used if desired. As previously discussed, the wafer may be a plastic wafer, glass wafer, or any other suitable wafer substrate as desired. The fabrication process may include modifying the surface of the wafer to create one or more piezoresistive regions, and in some cases, back side micro-machining to leave the diaphragm region 18.

First, an appropriate wafer 10 is selected, as shown at step 102. The thickness of the wafer 10, the area of the wafer 10, and the shape of the wafer 10 may all be considered. In some cases, some of these dimensions may be selected to be compatible with available integrated circuit processing equipment. Once the desired wafer 10 is selected, the wafer is cleaned. The wafer 10 may be cleaned in acetone, methanol, isopropanol, de-ionized water, and/or any other chemical or solvent as desired.

In the illustrative method shown in FIG. 1B, a masking layer 22 is then added, as shown at step 104. To create the masking layer 22, and in some embodiments, a photolithographic process is used. The masking layer 22 may include a photoresist layer, which in some cases, is applied to the wafer 10 in a spin coating process. The spin coating process may apply the photoresist in a uniform thickness over the wafer 10. The wafer with the photoresist may then be selectively exposed to ultra violet light or the like. The exposure to the light may create a desired pattern in the photoresist layer. A cleaning step may remove selected portions of the photoresist layer. In some cases, the portions of the photoresist layer may be selectively removed in areas where the piezoresistive regions 12 are desired. This is one illustrative method of masking the wafer 10 for implantation, but it is contemplated that any other process of masking the wafer 10 may be used as desired.

Once the wafer is selectively masked by masking layer 22, a first implantation may be performed on the wafer 10, as shown by arrows 103. In some cases, the first implant may be nitrogen, and may be performed by ion implantation. The nitrogen may be implanted at an energy of 50 KeV and a dose in the range of $5 \times 10^{15}$ cm$^{-2}$ to $1 \times 10^{17}$ cm$^{-2}$, and with a beam current which does not significantly increase the temperature of the wafer above a few hundred degrees Celsius (e.g. less than about 400° C. for a Kapton plastic wafer). However, it is contemplated that the dose and energy of the first implantation may be any suitable dose and any suitable energy as desired, so long as a piezoresistive effect is induced in the polymer wafer 10.

In some cases, a second implantation may also be provided for modulating the electrical conductivity of the piezoresistive regions formed by the first implantation. The second implant material may be boron, phosphorus, or any other suitable element or material, as desired. In some cases, boron may be implanted at an energy of 50 KeV, and a dose of approximately $1 \times 10^{17}$ cm$^{-2}$ with a beam current of around 300 microamperes. This second implantation may decrease the electrical resistivity of the piezoresistive region(s) by, for example, up to four orders of magnitude or more, as desired. Meanwhile, the non-implanted regions may have a higher electrical resistivity.

Because the second implantation step may allow the electrical conductivity of the piezoresistive region(s) to be increased, sometimes by a substantial amount, the size of the piezoresistive regions may be made controllable having a certain number of squares while still achieving a desired resistance value for the piezoresistive pressure sensor 8. Alternatively, or in addition, the sensitivity and/or signal-to-noise ratio (SNR) of the pressure sensor 8 may be increased. In some cases, the second implantation may be done before the first implantation. After the first and second implantation steps, the photoresist or masking layer 22 may be removed, as shown at step 106.

In the illustrative process, a photolithographic process may also be used to deposit metal electrodes and/or bonding pads 28, as shown at step 108. The photolithographic process, similar to that discussed above, may first provide a masking layer 30 of photoresist, which covers the top surface of the plastic substrate 10 except those regions that correspond to the desired metal electrodes and/or bonding pads 28. One or more metal layers 28 are then deposited. The geometry of the photoresist side walls 34 may be such that the metal layers 38 do not extend continuously on the photoresist side walls 34, as shown at step 108. This discontinuity in the metal deposition layer(s) 28 at the photoresist side walls 34 may be used to help lift-off simultaneously the metal 36 on the photoresist layer 30 and the photoresist layer 30 itself.

In the illustrative embodiment, the metal 28 is deposited to make an electrical connection between the piezoresistive region(s) 12 and bond pads. In some cases, the metal 28 is deposited by evaporation. In other cases, the metal 28 is deposited by sputtering or by any other suitable process as desired. In some cases, the metal 28 may be deposited in a sequence of metal layers to decrease the likelihood of metal de-lamination from the surface, if this is of a concern. For example, a 10 nm layer of chromium may be first deposited, followed by a 200 nm layer of gold, both while the substrate remains in a common vacuum.

In some cases, a thicker metal layer 28 may be desired. An electroplated thickening layer of gold, such as with a thickness of about 150 nm, may be further deposited on the existing gold layer, if desired. While chromium and gold are used as an example here, it is contemplated that any suitable metal or combination of metals may be deposited on the wafer as desired. Once the desired metal layer(s) 28 are deposited, the removal of the photoresist 30 and lift-off of the unwanted metal 36 may be performed, as shown at step 110. The wafer may then be cleaned in methanol, DI water, and/or any other solution as desired.

One alternative to the above lift-off technology for the metal deposition is the use of a mask-less additive process of metal deposition by ink-jet printing (not shown in the drawings). Here, solid-state gold, silver or other suitable layers may be provided by starting from liquid pastes of those materials (where also adherence components are incorporated in the paste). Ink-jet printing techniques may then be used to deposit the appropriate layers at the appropriate locations. In some cases, the resulting ink-jet printed layer(s) may then be thermally or laser treated at temperatures which can be tolerated by the adjacent plastic material(s).

Next, a back-side etch of the wafer 10 may be performed to create the diaphragm region 18. In some cases, aluminum 40 may first be deposited on both the front-side and the back-side of the wafer 10, as shown at step 112. The aluminum layer 40 may be, for example, about 200 nm thick. However, it is contemplated that any suitable thickness may be used, as desired. The aluminum 40 on the top-side of the wafer 10 may help provide surface protection to the top surface of the wafer 10. The aluminum 40 on the back-side of the wafer 10 may be patterned or selectively deposited as desired to only expose those portions of the back-side that correspond to the desired diaphragm region(s) 18. That is, the back-side aluminum 40 may be used as a mask for further micro-machining of the back-side of the wafer 10.

Once the back-side of the wafer 10 is patterned, as shown at step 112, the wafer 10 may be etched to create a diaphragm region 18 in the wafer 10, as shown at step 114. In some cases, the etch process may be a reactive ion etch (RIE) process. The RIE may include, for example, an oxygen plasma etch through the openings in the patterned aluminum layer 40 on the back-side of the wafer 10, and may be timed to result in a desired thickness for the diaphragm region 18. The etch rate may be, for example, about 1.3 micrometers per minute at a power of 300 watts and pressure of 0.2 mtorr. However, other RIE etch may be used at different powers and pressures as desired. To help improve the uniform thickness of the diaphragm region 18, and any bowing effect of the wafer 10, the wafer 10 may be kept flat during the RIE process.

Alternatively, the back-side etching process may include a wet etch of the wafer 10. In some cases, a transene etchant may be used, and an appropriate masking layer may be provided. The etch rate may be, for example, 0.07 mils/minute at 60° C., or any other etch rate and temperature as desired. After the wafer 10 has been back-side etched, the aluminum mask 40 may be removed from both the front and back side of the wafer 10, as shown at step 114.

Figure 1C:
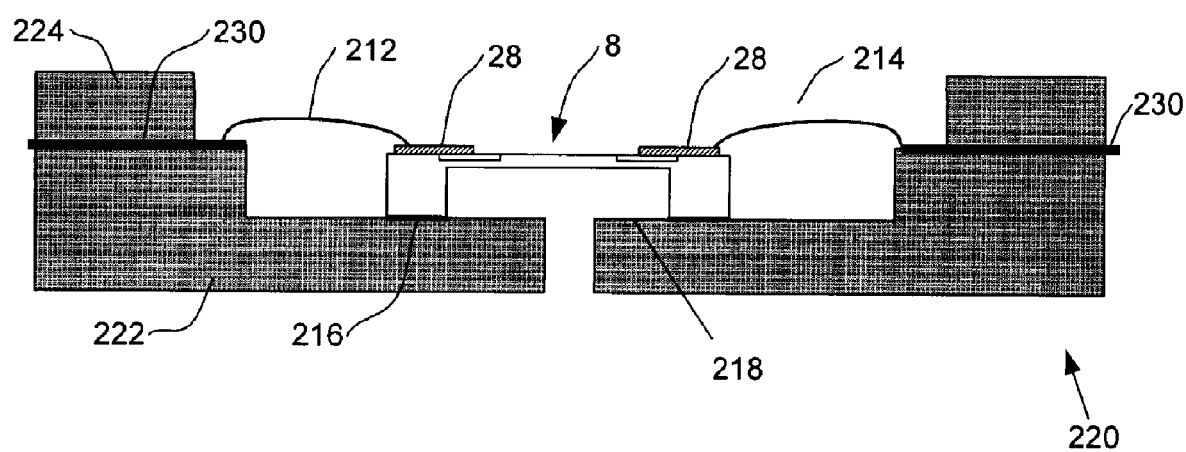
FIG. 1C is a schematic cross-sectional side view of an illustrative package for the illustrative piezoresistive pressure sensor in FIG. 1A.

FIG. 1C is a cross-sectional side view of an illustrative package for the piezoresistive pressure sensor of FIG. 1A. After the piezoresistive micro-machined pressure sensor 8 has been fabricated, it may be provided in a package. In some cases, the piezoresistive pressure sensor 8 may be all plastic (except the metal layers) and the packaging 220 may also be all plastic (except for the conducting leads and/or traces).

The wafer 10 may first be cut along inter-chip spaces in perpendicular directions during a dicing step, resulting in a number of pressure sensor die 8. The pressure sensor die 8 may be bonded to a plastic package base 222 using, for example, an adhesive 216. The adhesive may include, for example, a cyanoacrylate monomer (n-butyl cyanoacrylat), a plasticizer (dibutyl phatalate) 30% w/w, and a calixarene (4-tert-butyl-calix[4]arene-O,O',O",O"', tetraacetic acid tetraethyl ester.

In the illustrative embodiment, a wire bonding process is used to provide an electrical connection between the bond pads 28 on the pressure sensor die 8 and bond pads 230 on the package base 222. The wire bonding process may, for example, provide one or more lead wires 212 to make this connection. Other packaging techniques may also be used including, for example, flip chip bonding, bump bonding, etc., as desired.

In some cases, a flexible gel 214 may be provided above the upper surface of the pressure sensor die 8. The flexible gel 214 may act as a pressure-transmitting element and separation region. This may help provide a seal between the sensor 8 and the region where the pressure is to be measured. In the illustrative package, a plastic lid 224 may be mounted to the plastic base 222. The same adhesive as described above may be used to bond the plastic lid cover 224 to the plastic base 222, if desired. However, it is contemplated that any suitable bonding technique may be used to bond the plastic lid cover 224 (if provided) to the plastic base 222, as desired.

As can be seen, and in the illustrative embodiment, the entire sensor and package may be based on plastic materials, except for the metal wires 212 and/or metal traces that provide an electrical connection from the pressure sensor 8 to signal conditioning circuitry outside of the package. In other embodiments, it is contemplated that the plastic pressure sensor may be packaged in any suitable packaging material or in any suitable package configuration, as desired.

Figure 2A:
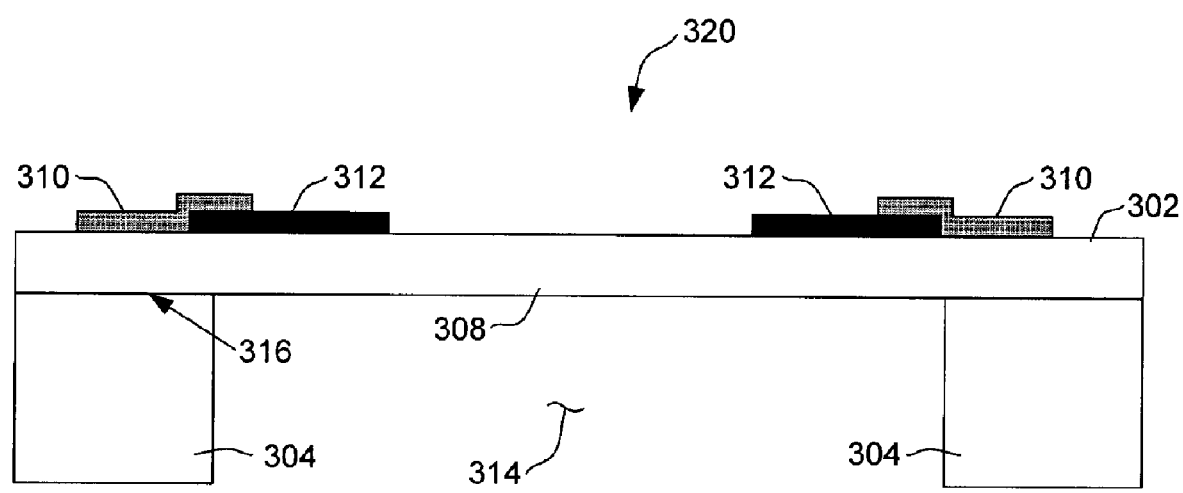
FIG. 2A is a schematic cross-sectional side view of another illustrative piezoresistive pressure sensor in accordance with the present invention.

FIG. 2A is a schematic cross-sectional side view of another illustrative piezoresistive pressure sensor 320 in accordance with the present invention. In this illustrative embodiment, a plastic pressure sensor 320 is micro-machined using MEMS technology, where two wafers are bonded together by hot pressing or by any other suitable technique. A first wafer 302 may be made of a relatively thin plastic sheet with a thickness approximately equal to the desired thickness of the pressure sensing diaphragm 308. The first wafer 302 may include a number of piezoresistive regions 312. The second wafer 304 may be thicker, and may be micro-machined to include holes 314, such as through etching, laser drilling, or any other suitable process.

When the two wafers 302 and 304 are bonded together, the hole 314 in the second wafer 304 may allow the pressure sensing diaphragm 308 to deflect under an external pressure such as in a downward direction. In some cases, a sensor housing or package (not shown) situated below the second wafer 304 may provide an overpressure stop that limits the amount of deflection of the diaphragm 308. Additionally, the hole 314 in the second wafer 304 may provide a vent that exposed the diaphragm 308 to a second medium when the sensor is configured as a differential pressure sensor, if desired.

Figure 2B:
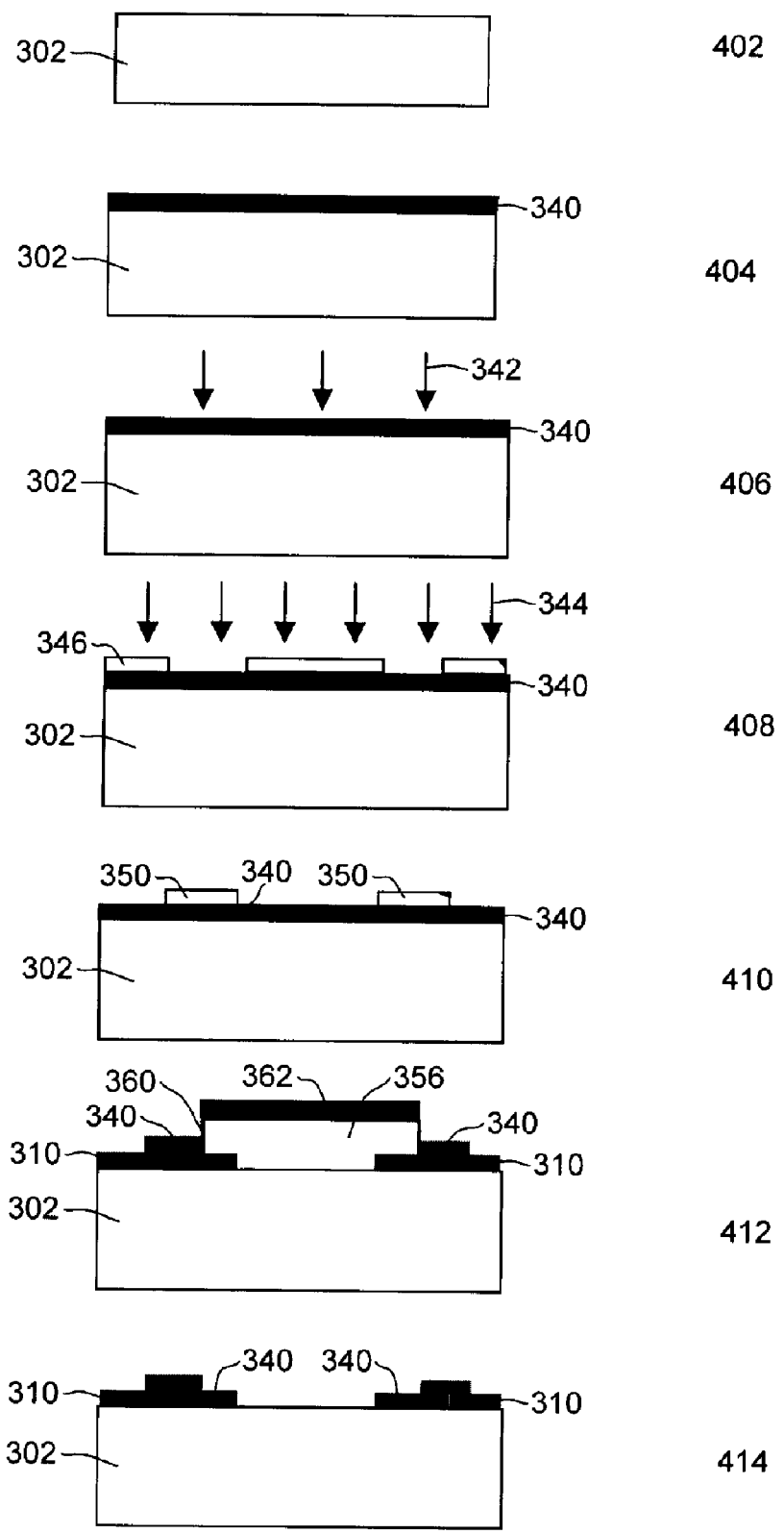
FIG. 2B is a schematic cross-sectional side view of an illustrative fabrication process of the illustrative piezoresistive pressure sensor of FIG. 2A.

FIG. 2B is a schematic diagram of an illustrative fabrication process for the illustrative piezoresistive pressure sensor 320 of FIG. 2A. In the illustrative fabrication process, there are four main stages including processing the first wafer 302; processing the second wafer 304; bonding the first wafer 302 to the second wafer 304; and sensor packaging.

The first stage includes processing the first wafer 302. An appropriate wafer is first selected, as shown at step 402. The thickness of the first wafer 302 may be chosen for mechanical considerations, such as, the maximum deflection of the pressure sensing diaphragm 308, the maximum strain in the diaphragm 308 (preferably remains in the elastic region of deformation), and other considerations. The first wafer 302 may be a plastic wafer such as Kapton, Liquid Crystal Polymer (LCP), or any other suitable plastic wafer, as desired.

Once the first wafer 302 is selected, thermal annealing may be performed. The thermal anneal may be at, for example, about 400° C., which may help assure thermal, chemical, and humidity resistance of the first wafer 302 during subsequent processing and operation of the sensor. However, it is contemplated that any other suitable temperature may be used to anneal the first wafer 302, as desired.

In the illustrative process shown in FIG. 2B, a SAN layer 340 is applied by spin coating, as shown at step 404. The SAN layer 340 may dry and consolidate on the first plastic wafer 302. Next, an implantation may be performed over at least part of the SAN layer 340, as shown by arrows 342 at step 406. In some cases, nitrogen may be implanted over the whole surface of the SAN layer 340. In some cases, the dose of ions may range from, for example, $1 \times 10^{16}$ cm$^{-2}$ to $1 \times 10^{17}$ cm$^{-2}$. The energy may be chosen so that the polymer SAN layer 340 is thinner than two times the mean range of ions in the film. This implantation may allow the SAN layer 340 to become piezoresistive and insoluble to acetone like solvents throughout the whole SAN layer 340 thickness. This may be important during subsequent photolithography, so that when a photoresist is removed, the integrity of the SAN layer 340 may not be significantly affected. It is contemplated that any element, which render to the SAN layer piezoresistive and chemical resistance to solvents properties may be implanted into the SAN layer 340, over any region or portion of the SAN layer 340, and at any suitable dose and energy as desired.

A second implantation may be performed, as shown by arrows 344 at step 408. Before the second implant 344 is performed, the first wafer 302 may be masked by a masking layer 346, also as shown at step 408. The first wafer 302 may be masked using any suitable photolithographic processes, such as that discussed above. For example, a photoresist masking layer 346 may be spun on the SAN layer 340, and patterned to selectively expose portions of the SAN layer 340.

Once the surface is masked, the second selective implantation 344 may be performed as shown at step 408. In some cases, the selective second implantation 344 may be a boron implantation. The dose and energy of the selective boron implantation may be determined by the desired electrical conductivity of the piezoresistive region. However, the second implantation may be any suitable element, and may be provided at any suitable dose and energy as desired. Once complete, the photoresist layer 346 may be removed from the first wafer 302.

The implanted SAN layer 340 may then be patterned, as shown at step 410. Before masking the first wafer 302 for patterning, the first wafer 302 may be cleaned as previously described. To mask the first wafer 302, aluminum 350 or another suitable material may be deposited. The aluminum may be deposited by E-gun, thermal evaporation, or by any other suitable method, as desired. While aluminum is used as an example, it is contemplated that any suitable material may be used as a masking layer 350 as desired. Photolithography may be used to pattern the aluminum 350 to obtain a desired mask configuration. The photolithographic process may be similar to that described above.

After the SAN layer 340 is masked 350 in the illustrative fabrication process, the SAN layer 340 may be etched as shown at step 410. The etching process may be, for example, a RIE, wet etch, or any other suitable process. The overall resistance of the piezoresistors will be dictated, at least in part, by the dimensions of the resulting SAN elements 340 and the electrical resistivity of the implanted SAN material, as modulated by the piezoresistivity effect. Once the SAN layer 340 has been etched, the aluminum mask 350 may be removed.

In the illustrative process, a lift-off photolithographic process may next be used to selectively deposit metal electrodes and/or bonding pads 310, as shown at step 412. The photolithographic process, similar to that discussed above, may first provide a masking layer 356 of photoresist, which covers the top surface of the first wafer 302 except those regions that correspond to the desired metal electrodes and/or bonding pads 310. One or more metal layers 310 are then deposited. The geometry of the photoresist side walls 360 may be such that the metal layers 310 do not extend continuously on the photoresist side walls 360, as shown at step 412. This discontinuity in the metal deposition layer(s) 310 at the photoresist side walls 360 may be used to help lift-off simultaneously the metal 362 on the photoresist layer 356 and the photoresist layer 356 itself.

In the illustrative embodiment, the metal 310 is deposited to make an electrical connection between the piezoresistive region(s) 340 and bond pads. In some cases, the metal 310 is deposited by evaporation. In other cases, the metal 310 is deposited by sputtering or by any other suitable process as desired. In some cases, the metal 310 may be deposited in a sequence of metal layers to decrease the likelihood of metal de-lamination from the surface, if this is of a concern. For example, a 10 nm layer of chromium may be first deposited, followed by a 200 nm layer of gold, both while the substrate remains in a common vacuum.

In some cases, a thicker metal layer 310 may be desired. An electroplated thickening layer of gold, such as with a thickness of about 150 nm, may be further deposited on the existing gold layer, if desired. While chromium and gold are used as an example here, it is contemplated that any suitable metal or combination of metals may be deposited on the wafer as desired. Once the desired metal layer(s) 310 are deposited, the removal of the photoresist 356 and lift-off of the unwanted metal 362 may be preformed, as shown at step 414. The first wafer 302 may then be cleaned in methanol, DI water, and/or any other solution as desired.

In some cases, a thicker metal layer can be deposited selectively, mask-less by ink-jetting additively a metal paste (like gold or silver) in the desired position of the future metal electrode and bond pads, followed by the thermal consolidation of the layer, as described above. One advantage of using a mask-less ink jet printing process is the absence of any lithographic process. Also, thicker metal layers may be more simply obtained by repetition of the ink-jet printing process in the same positions.

The second stage in the illustrative process may include processing the second wafer 304 to create holes in the second wafer 304 which may allow the diaphragm 308 to flex after the first wafer 302 and second wafer 304 are bonded together, in the presence of an outside pressure to be measured. The second wafer 304 is first selected. In some cases, the second wafer 304 may be plastic, such as Kapton, LCP, or any rigid plastic. In other cases, the second wafer 304 may be glass or any other suitable material, as desired. The thickness of the second wafer 304 may be selected to be equal to the maximum desired deflection of the diaphragm 308 of the first wafer 302. The plastic sensor package, on which the second wafer 304 is eventually bonded, may provide an over pressure stop for the diaphragm 308.

Once the second wafer 304 is selected, the second wafer 304 may be annealed at, for example, 400° C. for thermal, chemical, and mechanical stabilization. Photolithography may be used again to create a masking layer for the etching of the holes through the second wafer 304. The mask may be made so that the holes in the mask are similar to the desired holes in the second wafer 304. The pressure range to be measured, the resistor size, the resistor location on the tensile region or compressive region, and the diaphragm thickness may all be taken into consideration when designing the desired hole size.

Once the second wafer 304 is masked, the second wafer 304 may be etched. In some cases, the etchant process may be an RIE process. In other cases, the etchant process may be a wet etch process or any other suitable etching process as desired. The second wafer 304 may then be etched using any desired method so that the second wafer 304 may have a hole with a desired diameter or size in the opening. After the second wafer 304 has been selectively etched in RIE by means of an Al mask, the aluminum mask layer may be removed in a wet etching solution. In some cases, the wet etching solution for Al may be Transene. However, any suitable etchant may be used as desired.

Alternatively, the second wafer 304 may be processed to form holes by laser micro-machining. A laser beam having a wavelength of, for example, 248 nm or any other suitable wavelength, may be used to cut holes through the second wafer 304 at the desired locations. Another alternative is to create the holes in the second wafer 304 by drilling or mechanical punching, if desired.

After the first wafer 302 and the second wafer 304 have been processed, the first wafer 302 and the second wafer 304 may be bonded together. In one illustrative process, the first wafer 302 and the second wafer 304 may be aligned one over the other before starting the bonding process. The first wafer 302 and the second wafer 304 are placed in a relatively tight alignment so that the piezoresistors of the pressure sensitive diaphragm 308 of the first wafer 302 are properly aligned relative to the hole in the second wafer 304. The two pre-aligned wafers are then brought together.

To bond the two wafers, a jaw sealer may be used. The jaw sealer may produce a temperature between about 300° C. and 400° C., a pressure of about 10 psi to 30 psi, and may have a dwell time of about 5 to 50 seconds. In one case, the jaw sealer may be at 350° C., have a pressure of 20 psi, and a 20 second dwell time. In some cases, the temperature of the bonded wafers may be first ramped up to 300° C. to 400° C. and then ramped down to room temperature after the dwell time expires. Alternatively, the first wafer 302 and the second wafer 304 may be bonded together using an adhesive, or any other suitable bonding technique, as desired. The fourth stage includes packaging the bonded wafers in a plastic package. This process may be similar to that described above with respect to FIG. 1B.

Figure 3:
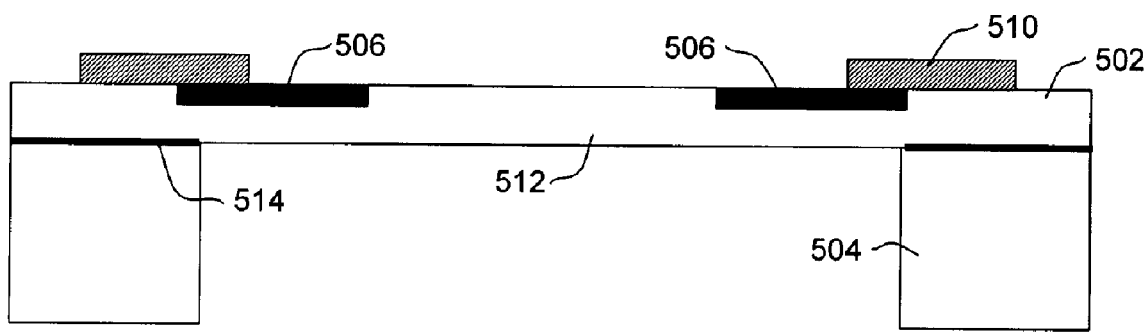
FIG. 3 is a schematic cross-sectional side view of another illustrative piezoresistive pressure sensor in accordance with the present invention.

FIG. 3 is a schematic diagram of another illustrative piezoresistive pressure sensor in accordance with the present invention. This illustrative embodiment includes a surface modified (e.g. implanted) first Kapton wafer 502 bonded to a micro-machined second glass wafer 504. To fabricate this illustrative embodiment, there are four stages of processing, including surface modification of the first wafer 502 to obtain the desired piezoresistive regions with the desired resistivity, micro-machining the second wafer 504 to provide holes of an appropriate size, bonding the first wafer 502 to the second wafer 504, and packaging the resulting pressure sensor.

As noted above, the first wafer 502 may be a Kapton wafer having a thickness that is substantially equal to the desired diaphragm thickness. The first wafer 502 may be implanted with nitrogen, and then boron to achieve the desired piezoresistive regions with the desired resistivity, similar to that discussed above with respect to FIG. 1B. Metal lines and bond pads may also be provided, also similar to that discussed above with respect to FIG. 1B.

The second stage includes micro-machining holes in the second wafer 504. This may include selecting a desired glass wafer (e.g. Pyrex), and in some cases, thinning the glass wafer to be substantially equal to the maximum desired deflection of the pressure sensing diaphragm of the first Kapton wafer 502. This may allow the package base (not shown) to provide an overpressure stop to the pressure sensing diaphragm of the first Kapton wafer 502. In some cases, the glass wafer 504 may have a temperature expansion coefficient that is similar to the temperature expansion coefficient of the Kapton wafer 502 and plastic base (not shown) of the sensor package.

Aluminum may be deposited on the front side and back side of the glass second wafer 504 by e-gun, thermal evaporation, or any other suitable method as desired. The aluminum on the front side of the glass wafer 504 may help provide some surface protection to the front side of the glass wafer 504 during the subsequent back-side micro-machining process. A photolithographic process may be used to pattern the aluminum on the back side of the glass wafer 504 to expose the glass wafer 504 in those regions that correspond to the desired micro-machined holes in the glass wafer 504. A deep RIE may then be performed to create holes through the glass wafer 504. After the etching of the glass wafer 504, the aluminum mask may be removed from the front side and back-side of the wafer, if desired. Rather than using an etching process to form the holes through the glass wafer 504, it is contemplated that the holes may be made by laser or mechanical drilling, punching, or any other suitable process, as desired.

The third stage in the illustrative process includes bonding the first Kapton wafer 502 to the micro-machined glass second wafer 504. The first Kapton wafer 502 is first aligned with the micro-machined glass second wafer 504. Next, the first Kapton wafer 502 is bonded to the micro-machined glass second wafer 504. For a Kapton to glass bond, an adhesive 514 may be used. In some cases, the adhesive 514 may include a polyacrylate, a plasticizer, and a cross-linker. The polyacrylate may be a cyanoacrylate monomer and the cross-liner may be a silane. In one case, the adhesive 514 may include a cyanoacrylate monomer (n-butyl cyanoacrylate), a plasticizer (dibutyl phatalate) 30% w/w, a silane (y-aminophenyl propyltryacetoxy silane), 0.01% to 5, 0% w/w, a calixarene (4-tertbutylcalix[4]arene-O,O',O",O"', tetraacetic acid tetraethyl ester (0.5-1)% or 4-tertbutylthyacalix[4]arene (0.5-1)%. The cyanoacrylate monomer may be used as the main component for adhesion (instant adhesive). The plasticizer may be used for adhesion improvement at the surface of the glass. The silane may have the role of creating bridges between the glass and the plastic, while the calixarene may have the role of an adhesion promoter between the glass and the plastic material. In other cases, the adhesive 514 may be any suitable adhesive, as desired. The fourth stage in the illustrative process may include the packaging of the pressure sensor. This may be similar to that described above with respect to FIG. 1C.

Figure 4:
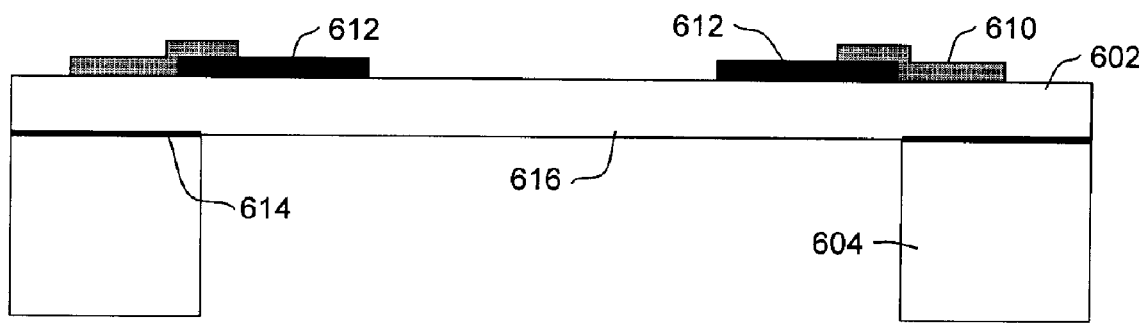
FIG. 4 is a schematic cross-sectional side view of yet another illustrative piezoresistive pressure sensor in accordance with the present invention.

FIG. 4 is a schematic diagram of yet another illustrative piezoresistive pressure sensor in accordance with the present invention. In this illustrative embodiment, the piezoresistive pressure sensor may have homogeneous conductive polymer thin film 612 spin coated on a polymer diaphragm 616, which is then bonded to a glass substrate 604.

This illustrative embodiment includes the formation of a piezoresistive thin film polystyrene co-acrylo-nitrile on a Kapton wafer 616, similar to that described above with respect to FIG. 2B. This wafer 602 may then be bonded with tight alignment to a glass substrate 604, similar to that described above with respect to FIG. 3.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

What is claimed is:

1. A piezoresistive pressure sensor comprising:
    a polymer substrate;
    a first implanted region of the polymer substrate having first ion implants therein, wherein the first ion implants impart piezoresistivity to the first implanted region; and
    a second implanted region in the polymer substrate that includes, at least in part, the first implanted region, the second implanted region having second ion implants, wherein the second ion implants modulate the electrical conductivity of at least part of the first implanted region.

2. The piezoresistive pressure sensor of claim 1 wherein the first ion implants include nitrogen.

3. The piezoresistive pressure sensor of claim 2 wherein the second ion implants include boron.

4. The piezoresistive pressure sensor of claim 2 wherein the second ion implants include phosphorus.

5. The piezoresistive pressure sensor of claim 1 wherein the polymer substrate is a plastic.

6. The piezoresistive pressure sensor of claim 5 wherein the plastic is Kapton.

7. The piezoresistive pressure sensor of claim 5 wherein the plastic is a liquid crystal polymer.

8. The piezoresistive pressure sensor of claim 1 wherein the polymer substrate includes a front side and a back side, wherein the first and second implanted regions are on the front side of the polymer substrate.

9. The piezoresistive pressure sensor of claim 8 further comprising a cavity extending in from the back side of the polymer substrate adjacent a pressure sensor diaphragm.

10. The piezoresistive pressure sensor of claim 1 including one or more metal layers extending from the second implanted region.

11. The piezoresistive pressure sensor of claim 1 wherein at least one of the metal layers is deposited using a mask-less ink-jet printing process.

12. The piezoresistive pressure sensor of claim 1 wherein the polymer substrate is mounted to a plastic package base.

13. The piezoresistive pressure sensor of claim 1 wherein the polymer substrate includes a diaphragm region, and the second implanted region is located on at least part of the diaphragm region.

14. The piezoresistive pressure sensor of claim 13 further comprising a second substrate situated adjacent to the first substrate, wherein the second substrate includes a hole that is in registration with the diaphragm region.

15. The piezoresistive pressure sensor of claim 14 wherein the second substrate is a plastic.

16. The piezoresistive pressure sensor of claim 14 wherein the second substrate is a glass.

17. A piezoresistive pressure sensor comprising:
    a polymer substrate;
    a polymer layer secured relative to the polymer substrate;
    a first implanted region in the polymer layer having first ion implants therein, wherein the first ion implants impart piezoresistivity to the first implanted region; and
    a second implanted region in the polymer layer that includes, at least in part, the first implanted region, the second implanted region having second ion implants, wherein the second ion implants modulate the electrical conductivity of at least part of the first implanted region.

18. The piezoresistive pressure sensor of claim 17 wherein the first ion implants include nitrogen.

19. The piezoresistive pressure sensor of claim 18 wherein the second ion implants include boron.

20. The piezoresistive pressure sensor of claim 18 wherein the second ion implants include phosphorus.

21. The piezoresistive pressure sensor of claim 17 wherein the polymer substrate is a plastic.

22. The piezoresistive pressure sensor of claim 21 wherein the plastic is Kapton.

23. The piezoresistive pressure sensor of claim 21 wherein the plastic is a liquid crystal polymer.

24. The piezoresistive pressure sensor of claim 17 wherein the polymer layer is a poly styrene co-acrylonitrile 80/20 (SAN).

25. The piezoresistive pressure sensor of claim 17 wherein the polymer layer is secured to the polymer substrate via an adhesive.

26. The piezoresistive pressure sensor of claim 25 wherein the adhesive is a cyanoacrylate monomer (n-butyl cyanoacrylat), a plasticizer (dibutyl phatalate) 30% w/w, and a calixarene (4-tert-butyl-calix arene-O, O', O", O''', tetraacetic acid tetraethyl ester.

27. A piezoresistive pressure sensor comprising:
a polymer substrate having a pressure sensing diaphragm region; and
a piezoresistive region extending in the diaphragm region, wherein the piezoresistive region includes first and second ion implants therein, wherein the first ion implants impart piezoresistivity to the piezoresistive region and the second ion implants effect the electrical conductivity of the piezoresistive region.

28. The piezoresistive pressure sensor of claim 27 wherein the polymer substrate is Kapton.

29. The piezoresistive pressure sensor of claim 27 wherein the polymer substrate is a liquid crystal polymer.

30. The piezoresistive pressure sensor of claim 27 wherein the first ion implants include nitrogen implants and the second ion implants include boron implants.

31. The piezoresistive pressure sensor of claim 27 wherein the first ion implants include nitrogen implants and the second ion implants include phosphorus implants.

32. A method of fabricating a piezoresistive pressure sensor having a polymer diaphragm, the method comprising the steps of:
selectively implanting a first ion implant in the polymer diaphragm to create a piezoresistive region; and
selectively implanting a second ion implant in at least a portion of the piezoresistive region to modulate the electrical conductivity of the piezoresistive region.

33. The method of claim 32 wherein the selectively implanted first ion implant and the selectively implanted second ion implant are implanted into the polymer diaphragm via ion implantation.

34. The method of claim 32 further comprising a polymer layer deposited on the polymer diaphragm, and the selectively implanted first ion implant and the selectively implanted second ion implant are implanted into the polymer layer via ion implantation.

35. The method of claim 34 wherein the polymer layer is a SAN layer.

36. The method of claim 32 wherein the first ion implant includes nitrogen, and the second ion implant includes boron.

37. The method of claim 32 wherein the first ion implant includes nitrogen, and the second ion implant includes phosphorous.

38. A piezoresistive pressure sensor comprising:
a polymer sensor having a piezoresistive region, the piezoresistive region including first ion implants therein, wherein the first ion implants impart piezoresistivity to the piezoresistive region, the piezoresistive region further having second ion implants therein, wherein the second ion implants modulate the electrical conductivity of at least part of the piezoresistive region; and
a polymer package substrate, wherein the polymer sensor is secured to the polymer package substrate via an adhesive.

39. The piezoresistive pressure sensor of claim 38 wherein the adhesive includes calixarene.

40. The piezoresistive pressure sensor of claim 38 wherein the first ion implants and the second ion implants are provided by ion implantation.

* * * * *